(12) United States Patent
Oh et al.

(10) Patent No.: US 7,630,117 B2
(45) Date of Patent: Dec. 8, 2009

(54) ELECTROLYTE COMPRISING EUTECTIC MIXTURE AND ELECTROCHROMIC DEVICE USING THE SAME

(75) Inventors: Jae Seung Oh, Seoul (KR); Byoung Bae Lee, Daejeon (KR); Jae Duk Park, Daejeon (KR); Su Jin Mun, Andong-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/229,716

(22) Filed: Sep. 20, 2005

(65) Prior Publication Data
US 2006/0072182 A1    Apr. 6, 2006

(30) Foreign Application Priority Data
Sep. 21, 2004    (KR) .................. 10-2004-0075509

(51) Int. Cl.
    *G02F 1/153*    (2006.01)
(52) U.S. Cl. ................. 359/270; 359/265; 359/267; 438/929
(58) Field of Classification Search .................. 359/270
    See application file for complete search history.

(56) References Cited

U.S. PATENT DOCUMENTS

| | | | |
|---|---|---|---|
| 5,441,827 A | | 8/1995 | Gratzel et al. |
| 5,521,019 A | * | 5/1996 | Alloin et al. .................. 429/33 |
| 5,827,602 A | | 10/1998 | Koch et al. |
| 5,828,432 A | | 10/1998 | Shashidhar et al. |
| 6,057,956 A | | 5/2000 | Ash et al. |
| 6,120,696 A | * | 9/2000 | Armand et al. ............. 252/62.2 |
| 6,171,522 B1 | * | 1/2001 | Michot et al. ............... 252/500 |
| 6,667,825 B2 | | 12/2003 | Lu et al. |
| 6,870,657 B1 | * | 3/2005 | Fitzmaurice et al. ........ 359/273 |

(Continued)

FOREIGN PATENT DOCUMENTS

DE    197 35 803    2/1999

(Continued)

OTHER PUBLICATIONS

Y.Hu, H.Li, X.Huang and L.Chen, "Novel room temperature molten salt electrolyte based on LiTFSI and acetamide for lithium batteries", Electrochem. Commun, (2004) vol. 6, p. 28-32.

(Continued)

*Primary Examiner*—Jessica T Stultz
(74) *Attorney, Agent, or Firm*—McKenna Long & Aldridge LLP

(57) ABSTRACT

Disclosed is an electrolyte for electrochromic devices, which includes a eutectic mixture comprising: (a) a compound having an acidic functional group and basic functional group; and (b) an ionizable lithium salt. An electrochromic device using the same electrolyte is also disclosed. Because the electrochromic device uses the electrolyte comprising the eutectic mixture, which is cost-efficient and has excellent thermal and chemical stability, there are no problems related with evaporation and exhaustion as well as flammability of electrolyte. Additionally, it is possible to minimize side reactions with constitutional elements of an electrochromic device and electrolyte, thereby improving the safety. Further, it is also possible to improve the quality of an electrochromic device by virtue of a broad electrochemical window and high electro-conductivity of the eutectic mixture.

15 Claims, 3 Drawing Sheets

U.S. PATENT DOCUMENTS

| | | | |
|---|---|---|---|
| 6,992,808 B2 * | 1/2006 | Shinozaki et al. | 359/265 |
| 7,163,765 B2 * | 1/2007 | Hosaka et al. | 429/185 |
| 2004/0094741 A1 * | 5/2004 | Sato et al. | 252/1 |
| 2006/0210873 A1 * | 9/2006 | Hollenkamp et al. | 429/200 |

FOREIGN PATENT DOCUMENTS

| | | |
|---|---|---|
| FR | 2697676 A1 | 5/1994 |
| JP | 2002-99001 | 4/2002 |
| JP | 2002-099001 | 4/2002 |
| WO | WO 00/51198 A | 8/2000 |
| WO | WO 03/046653 | 6/2003 |

OTHER PUBLICATIONS

J.H.Shin, W.A.Henderson and S.Passerini, "Ionic liquids to the rescue? Overcoming the ionic conductivity limitations of polymer electrolytes", Electrochem. Commun, (2003) vol. 5, p. 1016-1020.

H. Liang, H Li, Z. Way, F. Wu, L. Chen, and X. Huang, "New Binary Room-Temperature Molten Salt Electrolyte Based on Urea and LiTFSI", J. Phys. Chem. B 2001, 105, p. 9966-9969.

Yongsheng Hu et al., "Novel room temperature molten salt electrolyte based on LiTFSI and acetamide for lithium batteries," Laboratory for Solid State Ionics, Institute of Physics, Chinese Academy of Sciences, Electrochemistry Communication 6 (2004) 28-32.

Electrochromic material and application, Electronic Element and Material vol. 18, col. I, pp. 32-36.

* cited by examiner

① Conductive glass
② Electrolyte Inlet
③ Sealant
④ Electrochromic layer
⑤ Liquid or Solid electrolyte

ELECTROLYTE COMPRISING EUTECTIC MIXTURE AND ELECTROCHROMIC DEVICE USING THE SAME

This application claims the benefit of the filing date of Korean Patent Application No. 10-2004-0075509, filed on 21 Sep. 2004, in the Korean intellectual Property Office, the disclosure of which is incorporated herein in its entirety by reference.

TECHNICAL FIELD

The present invention relates to an electrolyte for electrochromic devices. More particularly, the present invention relates to an electrolyte for electrochromic devices, which comprises a eutectic mixture having a high electroconductivity and broad electrochemical window, and thus can improve the safety and quality of an electrochromic device at the same time. The present invention also relates to an electrochromic device comprising the same electrolyte.

BACKGROUND ART

In general, electrochromic devices are referred to as devices that experience a change in color due to an electrochemical redox reaction caused by the application of an electric field, resulting in a change in light transmission characteristics. There are many appliances using such electrochromic devices. One of the most successful appliances includes a rear view mirror for cars, which controls the glitter from the backside of a car in the night, or a smart window capable of automatic control depending on light strengths. When solar radiation is high, a smart window experiences a color change into a darker color tone in order to reduce the amount of solar radiation. On the other hand, a smart window experiences a color change into a lighter tone on cloudy days. Accordingly, smart windows are energy-efficient appliances. Further, continuous attempts are made to apply electrochromic devices to the field of display such as electric bulletin boards or e-books.

Electrochromic materials forming electrochromic devices are classified into reduction-colored materials and oxidation-colored materials. Reduction-colored materials are those colored by the acquisition of electrons and typically include tungsten oxides. On the other hand, oxidation-colored materials are those colored by the loss of electrons and typically include nickel oxides and cobalt oxides. Other electrochromic materials include inorganic metal oxides such as $V_2O_5$, $Ir(OH)_x$, $NiO_xH_y$, $TiO_2$, $MoO_3$, etc., conductive polymers such as PEDOT (poly-3,4-ethylenedioxythiophene), polypyrrole, polyaniline, polyazulene, polythiophene, polypyridine, polyindole, polycarbazole, polyazine, polyquinone, etc., and organic electrochromic materials such as viologen, anthraquinone, phenocyazine, etc.

The above inorganic metal oxides generate a change in color when lithium ions or hydrogen ions present in an electrolyte are doped into the inorganic metal oxides. On the contrary, as depicted in the following Reaction Scheme 1, conductive polymers, for example, polyaniline shows a light yellow color when it is present in a completely reduced state, while showing a blue color when it is present in an oxidized state. Various colors can be realized depending on the kinds of such conductive polymer.

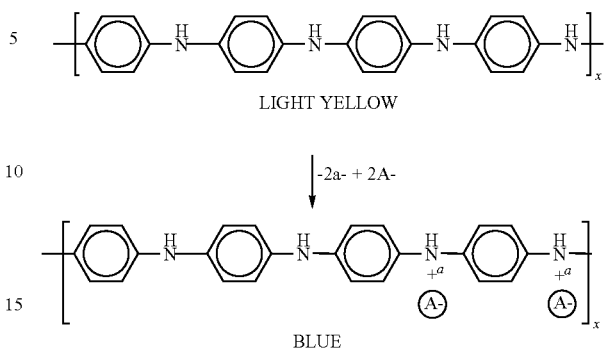

[Reaction Scheme 1]

In addition to the above-mentioned inorganic metal oxides and conductive polymers, organic electrochromic materials include viologen compounds such as 4,4'-dipyridinium salt represented by the following Reaction Scheme 2. A viologen compound has three types of oxidation states, i.e., $V^{2+}$ (colorless), $V^+$ (blue) and $V^0$ (light yellow), each oxidation state showing a different color:

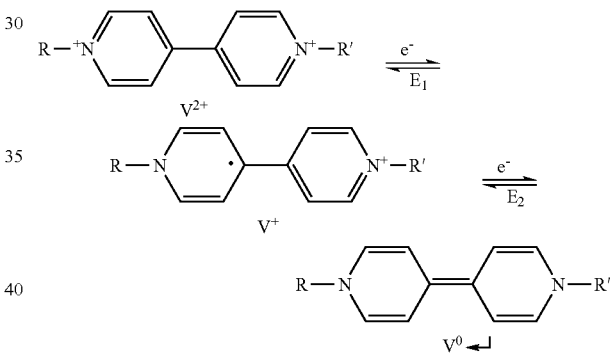

[Reaction Scheme 2]

Meanwhile, U.S. Pat. No. 5,441,827 (Graetzel et al.) discloses a device having high efficiency and high response rate, the device being manufactured by coating an electrochemically active organic viologen compound, as a single layer, onto the surface of a nanoporous thin film electrode obtained by sintering metal oxide nanoparticles. Additionally, the device uses a mixture of a lithium salt with an organic solvent such as γ-butyrolactone and propylene carbonate, as liquid electrolyte. However, the device using an organic solvent-containing liquid electrolyte has disadvantages in that quenching rate is low, residual images are present after quenching and that the organic materials may be decomposed easily during repeated developing/quenching cycles. Moreover, because the device uses an organic solvent-containing liquid electrolyte, it has additional disadvantages in that evaporation and exhaustion of the electrolyte may occur, the electrolyte may leak out from the device to cause an environmentally unfavorable problem, and that formation into thin films and film-shaped products is not allowed. Therefore, intensive research and development into the use of an ionic liquid (IL) as electrolyte for electrochemical devices have been made recently.

U.S. Pat. No. 5,827,602 (V. R. Koch et al.) discloses an ionic liquid electrolyte based on AlCl₃-EMICl (aluminum chloride-1-ethyl-3-methylimidazolium chloride) including a strong Lewis acid. The ionic liquid such as AlCl₃-EMICl has no vapor pressure, and thus can solve the problem of exhaustion and decomposition of electrolyte. However, it may emit toxic gases when exposed to a small amount of moisture and oxygen. Moreover, the ionic liquid is problematic in that it has high reactivity with organic/inorganic compounds added to the electrolyte in a small amount and that it is easily decomposed at a temperature of 150° C. or higher.

U.S. Pat. No. 6,667,825 (Wen Lu et al.) discloses an electrochromic device that uses a conductive polymer and an ionic liquid such as [BMIM] [BF₄] (1-butyl-3-methylimidazolium tetrafluoroborate) containing no Lewis acid, as electrode and electrolyte, respectively.

Japanese Patent Publication No. 2002-99001 discloses an electrochromic device that uses an electrochromic material such as methyl viologen or trimethyl methylferrocene along with an ionic liquid such as N1113TFSI (trimethylpropylammonium trifluoromethanesulfonimide) or EMITFSI (1-ethyl-3-methylimidazolium trifluoromethanesulfonimide as electrolyte.

However, conventional ionic liquids are problematic in that they are expensive, their preparation and purification are difficult, liquid electrolytes may leak out from electrochromic devices, and that formation into thin films and large sized products is not allowed. Meanwhile, Liang and coworkers prepared a room temperature-melting salt from urea and LiTFSI (*J. Phys. Chem. B* 2001, 105, pp 9966-9969). Additionally, Chen and coworkers developed a eutectic mixture of acetamide and LiTFSI, the eutectic mixture being used alone as liquid electrolyte for lithium secondary batteries (*Electrochem. Commun,* 2004, 6, pp 28-32). However, when the above liquid electrolyte was used in a Li/MnO₂ battery, both the initial battery capacity and battery capacity after the third cycle were significantly dropped (20%). Therefore, the liquid electrolyte is not suitable for practical use in batteries. In general, a drop in initial battery capacity and that in capacity during repeated cycles are related with a solid electrolyte interface (SEI) film formed on the surface of an anode upon the first charge cycle. In the case of the liquid electrolyte according to the prior art, it is thought that decomposition of the eutectic mixture having an electrochemical window ranging from 0.7 to 4.7V causes degradation of the battery quality despite the presence of a compound capable of forming an SEI film. Additionally, electrochemical reactions in a lithium battery occur through the lithium moved by the electrolyte injected between a cathode and anode. However, because the eutectic mixture according to the prior art has relatively high viscosity, both lithium transfer rate and swellability of electrode with the eutectic mixture are low, resulting in degradation of the overall battery quality. Moreover, there is no suggestion that the eutectic mixture may be applied to electrochromic devices relevant to the present invention.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Therefore, the present invention has been made in view of the above-mentioned problems. We have found that when a cost-efficient eutectic mixture having excellent thermal and chemical stability is used in an electrolyte for electrochemical devices, it is possible to solve the problems of evaporation, exhaustion and flammability of electrolytes caused when using a conventional organic solvent as electrolyte, thereby improving the safety. We have also found that it is possible to improve the quality of an electrochemical device by virtue of excellent conductivity and a broad electrochemical window of the eutectic mixture.

It is an object of the present invention to provide an electrolyte for electrochemical devices, which comprises a eutectic mixture, and an electrochromic device using the same electrolyte.

According to an aspect of the present invention, there is provided an electrolyte for electrochromic devices, which includes a eutectic mixture comprising: (a) a compound having an acidic functional group and basic functional group; and (b) an ionizable lithium salt. According to another aspect of the present invention, there is provided an electrochromic device using the above-mentioned electrolyte.

Hereinafter, the present invention will be explained in more detail.

The present invention is characterized in that a eutectic mixture, which has never been used in conventional electrochromic devices, is used for forming an electrolyte for electrochromic devices.

Generally, a eutectic mixture is referred to as a mixture containing two or more substances and having a decreased melting point. Particularly, such eutectic mixtures include mixed salts present in a liquid phase at room temperature. Herein, room temperature means a temperature of up to 100° C., or a temperature of up to 60° C. in some cases.

Similarly to known ionic liquids, eutectic mixtures have a high electroconductivity, broad electrochemical window, inflammability, broad range of temperatures where they are present as liquid, high salvation capability and non-coordinate bond formability. Therefore, eutectic mixtures have physicochemical properties as environmental-friendly solvents capable of substituting for known harmful organic solvents. Additionally, eutectic mixtures are prepared more easily compared to ionic liquids and have good flame resistance, high ion concentration and a broad electrochemical window (0-5.5 V), and thus are expected to be applied to a broad range of industrial fields.

Figure 2:
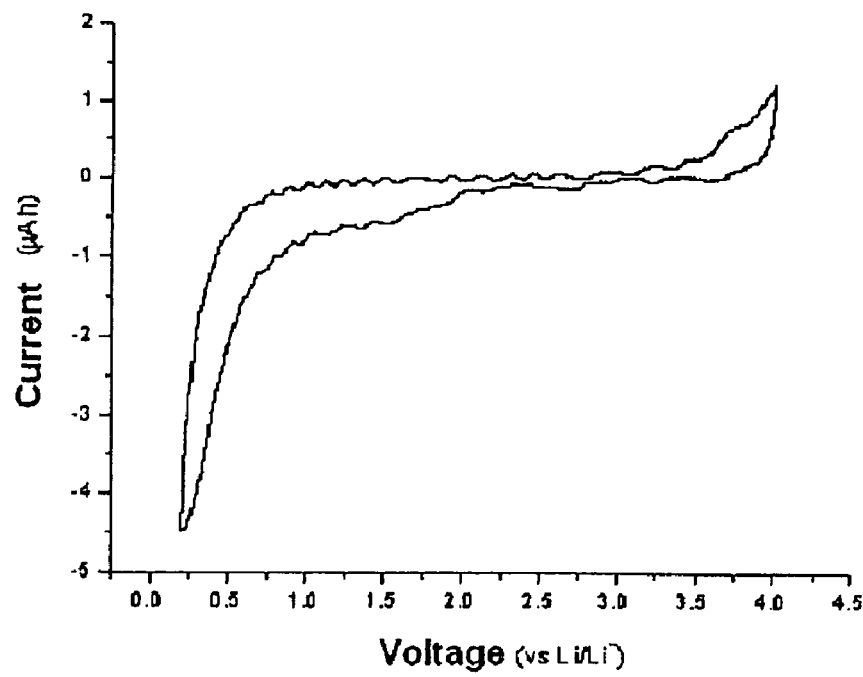
FIG. 2 is a graph showing the reduction potential window of caprolactam-LiTFSI (Lithium Trifluoromethane sulfonimide) eutectic mixture (molar ratio 3:1) according to Example 4.
Figure 3:
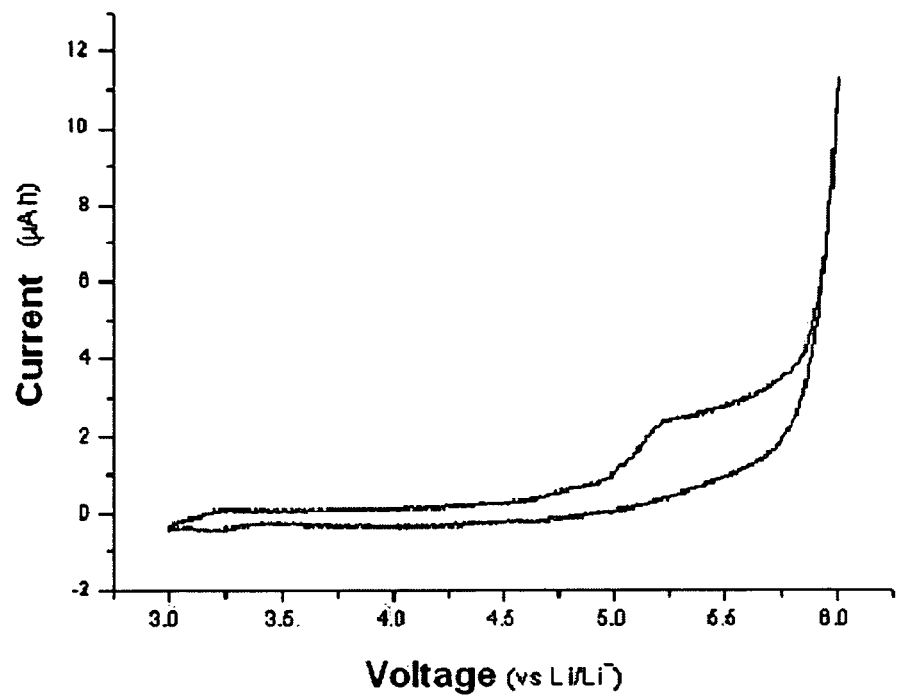
FIG. 3 is a graph showing the oxidation potential window of caprolactam-LiTFSI (Lithium Trifluoromethane sulfonimide) eutectic mixture (molar ratio 3:1) according to Example 4.

1) The electrolyte comprising a eutectic mixture according to the present invention shows a broader electrochemical window compared to conventional organic solvents and ionic liquids due to the unique properties of the eutectic mixture (for example, stability of the eutectic mixture itself). Therefore, the electrolyte according to the present invention allows broadening of the range of applicable voltages. In fact, as demonstrated by the following Experimental Example, conventional electrolytes comprising ionic liquids and organic solvents show an electrochemical window of 4-4.5 V. On the contrary, the eutectic mixture according to the present invention shows an electrochemical window of 4.5-5.5V, which is broader compared to conventional electrolytes comprising ionic liquids and organic solvents. Particularly, the eutectic mixture of caprolactam/LiTFSI shows an electrochemical window of 5.5V and thus can be used under high drive voltages (see, FIGS. 2 and 3).

Additionally, eutectic mixtures have no vapor pressure contrary to conventional solvents, resulting in prevention of evaporation and exhaustion of an electrolyte. Also, eutectic mixtures show good flame resistance, thereby improving the safety. Moreover, because the eutectic mixture is very stable in itself, it is possible to prevent undesired side reactions in electrochemical devices. Further, high conductivity of the eutectic mixture results in improvement in the quality of an electrochemical device.

2) In addition to the above advantages, because the eutectic mixture according to the present invention comprises a lithium salt as essential constitutional element. Therefore, it is not necessary to add a separate lithium salt even in the case of an electrochromic device that permits a change in color by lithium ions doped into an electrode (for example, an electrochromic device using an inorganic metal oxide).

In other words, when using a conventional ionic liquid as electrolyte, an electrochromic device experiencing a change in color by electron movements has no need of an additional lithium salt. On the other hand, an electrochromic device using an inorganic metal oxide such as $WO_3$ or $NiO_x$ as electrode permits a change in color by cations (for example, lithium ions) doped into the electrode. Thus, in the latter case, there is a need of an additional lithium salt. However, because the eutectic mixture according to the present invention comprises a lithium salt in itself, there is no need of an additional lithium salt.

One constitutional element of the eutectic mixture according to the present invention is a compound having at least two polar functional groups in its molecule (for example, a compound having an acidic functional group and basic functional group at the same time). There is no particular limitation in the compound, as long as it satisfies the above requirement. Examples of such acidic and basic functional groups include amine(—$NH_3^+$) and carbonyl(—CO) groups, respectively. Such polar groups serve as complexing agent that weakens the bond between a cation and anion of an ionizable salt, and thus contribute to formation of a eutectic mixture, thereby decreasing the melting point. In addition to the above functional groups, compounds comprising polar functional groups that can weaken the bond between a cation and anion of an ionizable salt and thus capable of forming a eutectic mixture are also included in the scope of the present invention.

Preferably, the compound having an acid functional group and basic functional group is an amide compound having two polar functional groups, i.e., a carbonyl-group and amine group. Non-limiting examples of the amide compound include C1~C10 alkyl amide, alkenyl amide, aryl amide or alkylaryl amide compounds. It is a matter of course that the amide compounds include primary, secondary and tertiary amide compounds as well as linear and/or cyclic amide compounds. It is more preferable to use a cyclic amide compound showing a broader electrochemical window, because such cyclic amide compounds have a smaller number of hydrogen atoms and are stable under a high voltage so as to prevent decomposition thereof. Non-limiting examples of the amide compound that may be used in the present invention include acetamide, urea, methyl urea, caprolactam, valerlactam, carbamate, formate and mixtures thereof.

The other constitutional element of the eutectic mixture according to the present invention is an ionizable lithium-containing salt. Non-limiting examples of the lithium salt that may be used in the present invention include lithium nitrate, lithium acetate, lithium hydroxide, lithium sulfate, lithium alkoxide, lithium halide, lithium oxide, lithium carbonate, lithium oxalate, etc. Particularly preferred examples of the lithium salt include $LiN(CN)_2$, $LiClO_4$, $Li(CF_3)_3PF_3$, $Li(CF_3)_4PF_2$, $Li(CF_3)_5PF$, $Li(CF_3)_6P$, $Li(CF_2CF_2SO_3)_2N$, $Li(CF_3SO_3)_2N$, $LiCF_3SO_3$, $LiCF_3CF_2$ $(CF_3)_2CO$, $Li(CF_3SO_2)_2C$, $Li(CF_3SO_2)_3C$, $LiCF_3(CF_2)_7SO_3$, $LiCF_3CO_2$, $LiCH_3CO_2$ and mixtures thereof.

The eutectic mixture according to the present invention may be represented by the following formula 1:

[Formula 1]

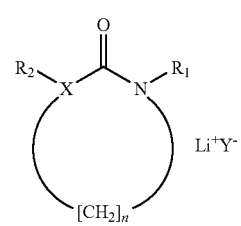

wherein $R_1$ is a hydrogen atom, C1~C20 alkyl group, C1~C20 alkylamine group, alkenyl group, aryl group or allyl group;

$R_2$ is a hydrogen atom, C1~C20 alkyl group, alkenyl group, aryl group or allyl group;

X is a hydrogen, oxygen, carbon or nitrogen atom;

Y is an anion of a lithium salt; and

N is an integer of between 0 and 10.

In the compound represented by the above formula 1, there is no particular limitation in the anion Y of a lithium salt. However, it is preferable that Y is $F^-$, $Cl^-$, $Br^-$, $I^-$, $NO_3^-$, $N(CN)_2^-$, $BF_4^-$, $ClO_4^-$, $RSO_3^-$, $RCOO^-$; $PF_6^-$, $(CF_3)_2PF_4^-$, $(CF_3)_3PF_3^-$, $(CF_3)_4PF_2^-$, $(CF_3)_5 PF^-$, $(CF_3)_6P^-$, $(CF_3SO_3^-)_2$, $(CF_2CF_2SO_3^-)_2$, $(CF_3SO_3)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, SCN or $(CF_3CF_2SO_2^-)_2N$.

As shown in the following Reaction Scheme 3, the first constitutional element of the eutectic mixture, i.e., the compound having an acidic functional group and basic functional group (more particularly an amide compound) forms a coordination bond with the second constitutional element of the eutectic mixture, i.e., the lithium salt, through the carbonyl group of the amide compound and the lithium cation of the lithium salt. Additionally, the anion of the lithium salt forms a hydrogen bond with the amine group of the amide compound. As a result, both constitutional elements form a eutectic mixture present in a liquid phase at room temperature.

[Reaction Scheme 3]

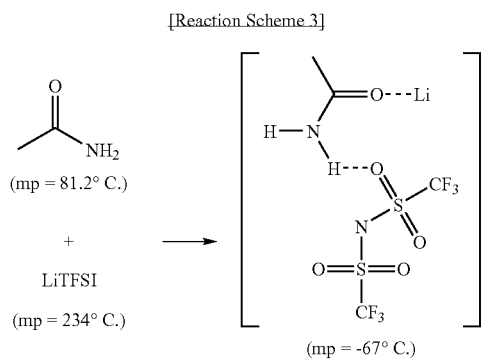

Although there is no particular limitation in melting point of the eutectic mixture according to the present invention, it is preferable that the eutectic mixture is present in a liquid state at a temperature of up to 100° C., more preferably at room temperature. Also, although there is no particular limitation in viscosity of the eutectic mixture according to the present invention, the eutectic mixture preferably has a viscosity of 100 cp or less.

The eutectic mixture may be prepared by a conventional process known to one skilled in the art. For example, a compound having an acidic functional group and basic functional group is mixed with a lithium salt at room temperature and then the mixture was reacted by heating it at a suitable temperature of 70° C. or less, followed by purification. Herein, the molar ratio (%) of the compound having an acidic functional group and basic functional group to lithium salt suitably ranges from 1:1 to 8:1, more preferably from 2:1 to 6:1.

<Electrolyte Comprising Eutectic Mixture>

The eutectic mixture according to the present invention may be used as electrolyte regardless of the particular type of electrolyte. However, two embodiments of electrolytes, i.e., a liquid electrolyte and gel polymer electrolyte are preferred.

1) A liquid electrolyte according to the present invention may be formed by using the above-described eutectic mixture alone, the eutectic mixture comprising the compound having an acidic functional group and basic functional group and the lithium salt.

2) According to another embodiment of the present invention, a gel polymer electrolyte may be formed by polymerizing monomers in the presence of the above-described eutectic mixture, or by impregnating a conventional polymer or gel polymer with the above-described eutectic mixture.

① First, a gel polymer electrolyte obtained by polymerization will be explained in detail.

The gel polymer electrolyte may be formed by polymerization of an electrolyte precursor solution, which comprises: (i) a eutectic mixture comprising a compound having an acidic functional group and basic functional group and an ionizable lithium salt; and (ii) monomers capable of forming a gel polymer by polymerization.

There is no limitation in the kind of monomer as long as it is capable of forming a gel polymer by polymerization and particular examples of such monomers include vinyl monomers, etc. Vinyl monomers have advantages in that they can provide transparent polymerization products when mixed with a eutectic mixture and they are amenable to simple polymerization conditions.

Non-limiting examples of the vinyl monomer that may be used according to the present invention include acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxystyrene, para-cyanostyrene, etc.

Preferably, the monomer capable of forming a gel polymer by polymerization provides low volumetric shrinkage upon polymerization and permits in-situ polymerization inside of an electrochromic device.

Meanwhile, the electrolyte precursor solution may further comprise a conventional polymerization initiator or photoinitiator.

Initiators are decomposed by heat or UV rays to form radicals, and then react with a monomer through free radical polymerization to form a gel polymer electrolyte. It is also possible to carry out polymerization of monomers without using any initiator. Generally, free radical polymerization includes an initiation step in which transient molecules or active points having strong reactivity are formed; a propagation step in which a monomer is added to the end of an active chain to form another active point at the end of the chain; a chain transfer step in which active points are transferred to other molecules; and a termination step in which the center of an active chain is broken.

Thermal initiators that may be used in the polymerization include organic peroxides or hydroperoxides such as benzoyl peroxide, acetyl peroxide, dilauryl peroxide, di-tert-butyl peroxide, cumyl hydroperoxide, hydrogen peroxide, etc., and azo compounds such as 2,2-azobis(2-cyanobutane), 2,2-azobis(methylbutyronitrile), AIBN(azobis(iso-butyronitrile), AMVN (azobisdimethyl-valeronitrile), organometallic compounds such as alkylated silver compounds, etc. Additionally, non-limiting examples of the photoinitiator that permits formation of radicals by the light such as UV rays include chloroacetophenone, diethoxy acetophenone(DEAP), 1-phenyl-2-hydroxy-2-methyl propaneone(HMPP), 1-hydroxycyclrohexyl phenyl ketone, α-aminoacetophenone, benzoin ether, benzyl dimethyl ketal, benzophenone, thioxanthone, 2-ethylanthraquinone(2-ETAQ), etc.

In addition to the above-described materials, the precursor solution of gel polymer electrolyte according to the present invention optionally further comprises other additives known to one skilled in the art.

In order to form a gel polymer electrolyte by using the above-described electrolyte precursor solution according to a conventional method, three types of methods may be used.

The first method comprises forming the gel polymer electrolyte by in-situ polymerization inside an electrochemical device. In-situ polymerization that may be used in the present invention may be performed by heating or UV irradiation. Additionally, formation of the gel polymer electrolyte depends on polymerization time and polymerization temperature in the case of thermal polymerization, or on irradiation dose in the case of UV polymerization. Typically, polymerization time ranges from about 20 to 60 minutes and thermal polymerization temperature ranges from 40 to 80° C.

Additionally, the mixing ratio in the electrolyte precursor solution according to the present invention on the weight basis, i.e., the weight ratio of (eutectic mixture) x:(monomer capable of forming a gel polymer by polymerization) y:(polymerization initiator) z, is 0.5~0.95:0.05~0.5:0.00~0.05, with the proviso that x+y+z=1. More preferably, x is 0.7~0.95, y is 0.05~0.3 and z is 0.00~0.01.

Polymerization by heating or UV irradiation as described above results in complete formation of a gel polymer electrolyte. More particularly, it is possible to control the polymerization degree of a gel polymer according to several reaction factors such as polymerization time, polymerization temperature or irradiation dose, wherein polymerization time depends on the kind of an initiator and polymerization temperature. According to the present invention, it is important that the gel polymer electrolyte should be free from leakage and should not cause volumetric shrinking due to over-polymerization of the electrolyte.

② In addition to the above in-situ polymerization method, another method may be used in forming a gel polymer electrolyte comprising a eutectic mixture according to the present invention. The second method comprises injecting the eutectic mixture into a preformed polymer or gel polymer so that the polymer or gel polymer can be impregnated with the ionic liquid.

Non-limiting examples of the polymer that may be used include polymethyl methacrylate, polyvinylidene difluoride, polyvinyl chloride, polyethylene oxide, polyhydroxyethyl methacrylate, etc. Any gel polymers known to one skilled in the art may also be used. In this case, it is possible to simplify processing steps compared to the above in-situ polymerization method.

③ The third method of forming a gel polymer electrolyte comprising a eutectic mixture according to the present invention comprises dissolving the eutectic mixture and a polymer in a solvent and removing the solvent to form a gel polymer electrolyte. In this method, the eutectic mixture is contained in the matrix formed of the polymer as described above.

Although there is no particular limitation in selecting the solvent, non-limiting examples of the solvent include toluene, acetone, acetonitrile, THF, etc. Additionally, there is no particular limitation in the method for removing the solvent and any conventional heating methods may be used. However, the third method has a disadvantage in that there is a need of a post-treatment step for removing a solvent in order to form the gel polymer electrolyte.

The electrolyte according to the present invention shows the following advantages, regardless of the particular type thereof (i.e., electrolyte using the eutectic mixture alone, electrolyte comprising a polymer or gel polymer impregnated with the eutectic mixture, or electrolyte obtained by in-situ polymerization of monomers capable of forming a gel polymer by polymerization):

a) The electrolyte has high electroconductivity.

b) The eutectic mixture shows a broader electrochemical window compared to organic solvents and ionic liquids.

c) It is possible to reduce side reaction in an electrochemical device due to the stability of the eutectic mixture.

d) There is no need of an additional lithium salt by virtue of the lithium salt contained in the eutectic mixture.

e) The electrolyte using the eutectic mixture is prepared with ease at low cost compared to conventional ionic liquids.

f) There is no problem of evaporation and exhaustion of electrolyte because the eutectic mixture has no vapor pressure.

g) The eutectic mixture is inflammable.

<Electrochromic Device Using Electrolyte Comprising Eutectic Mixture>

The electrochromic device according to the present invention includes a first electrode and a second electrode, disposed on a transparent or translucent substrate, and the electrolyte as disclosed herein, wherein the first electrode, the second electrode, the electrolyte, or combinations thereof include an electrochromic material.

Non-limiting examples of the electrochromic material that may be used in the present invention include inorganic metal oxides such as $WO_3$, $Ir(OH)_x$, $MoO_3$, $V_2O_5$, $TiO_2$, $NiO_x$, $LiNiO_x$, $Li_2NiO_x$, etc.; conductive polymers such as polypyrrole, polyaniline, polyazulene, polypyridine, polyindole, polycarbazole, polyazine, polythiophene, etc.; organic electrochromic materials such as viologen, anthraquinone, phenocyazine, etc; and mixtures thereof.

More particularly, either or both of the first electrode and second electrode may be formed of a transparent conductive film. Particular examples of the material for forming such transparent conductive films include ITO (indium tin oxide), FTO (fluorine doped tin oxide), IZO (indium zinc oxide) or mixtures thereof.

The electrochromic device may be manufactured according to a conventional method known to one skilled in the art. In one embodiment, the method includes the steps of: laminating the first electrode and second electrode by means of an adhesive, injecting the above-described electrolyte into the gap between the first electrode and the second electrode through an inlet and sealing the inlet.

There is no particular limitation in the kind of electrolyte injected to an electrochromic device. However, it is preferable that (i) the eutectic mixture is used alone as electrolyte; (ii) the electrolyte precursor solution comprising the eutectic mixture and the monomer capable of forming a gel polymer is injected into the gap between both electrodes and then in-situ polymerization is performed inside the electrodes to form the gel polymer electrolyte comprising the eutectic mixture; or (iii) a conventional polymer or gel polymer is impregnated with the eutectic mixture to form the gel polymer electrolyte. Particularly, it is more preferable that the eutectic mixture-containing gel polymer electrolyte is formed by in-situ polymerization performed between both electrodes of an electrochromic device. This results from the following reasons. It is easier to inject the electrolyte into the gap between the electrodes compared to injection or lamination of the gel polymer electrolyte impregnated with the eutectic mixture into the gap between the electrodes. Additionally, it is possible to obtain more improved wetting and contacting capability between the eutectic mixture-containing gel polymer electrolyte and the electrodes. Further, the in-situ polymerization method for forming the gel polymer electrolyte is advantageous in that it is performed by very simple processing steps including a step of mixing a eutectic mixture with a monomer at a predetermined ratio and a step of carrying out in-situ polymerization at an adequate temperature to form the gel polymer electrolyte.

Practically, the electrochromic device using the eutectic mixture-containing electrolyte according to the present invention provides the following advantages:

a) The developing/quenching rate of the electrochromic device is high, because the eutectic mixture has a higher electroconductivity compared to conventional organic solvent-based electrolytes.

b) The eutectic mixture-containing electrolyte has a broad electrochemical window, and thus provides an electrochromic device with an improved response rate under the application of a higher drive voltage.

c) The gel polymer serves to retain the eutectic mixture, and thus solves the problem of electrolyte leakage and allows thin-film formation and processing into film-shaped products.

BEST MODE FOR CARRYING OUT THE INVENTION

Reference will now be made in detail to the preferred embodiments of the present invention. It is to be understood that the following examples are illustrative only and the present invention is not limited thereto.

PREPARATION EXAMPLE 1

Figure 1:
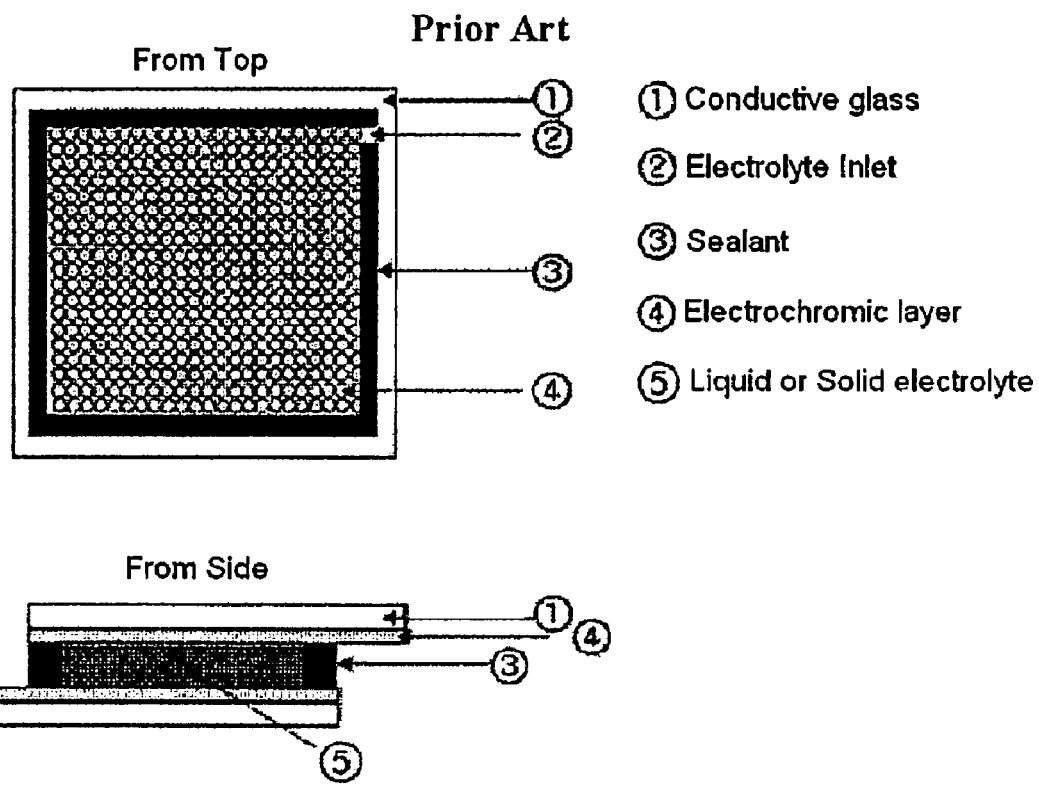
FIG. 1 is a schematic view showing a conventional electrochromic device.

Manufacture of Electrochromic Device Using Inorganic Metal Oxide-Based Electrochromic Material in the Absence of Electrolyte A working electrode was manufactured by forming a thin film of $WO_3$ on ITO (indium tin oxide) glass (Samsung Corning Co.) as transparent electrode through a sputtering process to a thickness of 150 nm. A counter electrode provided with a thin film of NiO having a thickness of 150 nm was also manufactured in the same manner as described above. The working electrode and the counter electrode were sealed together along their edges except a portion by using a sealant containing a glass ball spacer, as shown in FIG. 1, to provide an electrochromic device free from electrolyte.

PREPARATION EXAMPLE 2

Manufacture of Electrochromic Device Using Conductive Polymer-Based Electrochromic Material in the Absence of Electrolyte A working electrode was manufactured by coating PEDOT (poly-3,4-ethylenedioxythiophene) as electrode material on ITO glass as transparent electrode through an electropolymerization process to a thickness of about 150 nm. A counter electrode provided with a coating layer of PAN (polyaniline) as electrode material having a thickness of about 150 nm was also manufactured in the same manner as described above. The working electrode and the counter electrode were treated in the same manner as the above Preparation Example 1 to provide an electrochromic device free from electrolyte.

PREPARATION EXAMPLE 3

Manufacture of Electrochromic Device Using Inorganic Metal Oxide-Based Electrochromic Material in the Absence of Electrolyte A working electrode was manufactured by forming a thin film of $WO_3$ on FTO (fluorine doped tin oxide) glass (Libby-Owens-Ford Glass Co.) as transparent electrode through a vapor deposition process to a thickness of 200 nm. A counter electrode provided with a thin film of $LiNiO_x$ having a thickness of 230 nm was also manufactured in the same manner as described above. The working electrode and the counter electrode were treated in the same manner as the above Preparation Example 1 to provide an electrochromic device free from electrolyte.

EXAMPLES 1-12

Example 1

1-1. Preparation of Acetamide-LiTFSI Eutectic Mixture 5 g of purified acetamide and 6 g of LiTFSI (lithium trifluoromethanesulfonamide) were introduced into a round-bottom flask and stirred gradually at room temperature under nitrogen atmosphere for 12 hours to provide 11 g of the eutectic mixture of acetamide with LiTFSI.

1-2. Electrochromic Device (1) Comprising Acetamide-LiTFSI Eutectic Mixture as Liquid Electrolyte The eutectic mixture of acetamide with LiTFSI obtained from Example 1-1 was injected into the electrochromic device obtained from Preparation Example 1. The electrochromic device developed a blue color and showed a transmission of 32%. Upon quenching, the electrochromic device showed a transmission of 75%.

1-3. Electrochromic Device (2) Comprising Acetamide-LiTFSI Eutectic Mixture as Liquid Electrolyte The eutectic mixture of acetamide with LiTFSI obtained from Example 1-1 was injected into the electrochromic device obtained from Preparation Example 3. The electrochromic device developed a black color and showed a transmission of 15%. Upon quenching, the electrochromic device showed a transmission of 74%.

1-4. Electrochromic Device (1) Comprising Acetamide-LiTFSI Eutectic Mixture as Gel Polymer Electrolyte The eutectic mixture of acetamide with LiTFSI obtained from Example 1-1, HEMA (2-hydroxyethyl methacrylate) as monomer and AMVN (azobisdimethyl-valeronitrile) as thermal polymerization initiator were mixed in a weight ratio of 8:2:0.01 and the resultant mixture was injected into the electrochromic device obtained from Preparation Example 1 through an inlet for electrolyte. Then, the inlet was sealed with a UV sealant and polymerization was carried out at a temperature of 55° C. for 1 hour to form a gel polymer electrolyte. The electrochromic device developed a dark blue color and showed a transmission of 33%. Upon quenching, the electrochromic device showed a transmission of 78%.

1-5. Electrochromic Device (2) Comprising Acetamide-LiTFSI Eutectic Mixture as Gel Polymer Electrolyte Example 1-4 was repeated to form a gel polymer electrolyte, except that the eutectic mixture of acetamide with LiTFSI obtained from Example 1-1 was injected into the electrochromic device obtained from Preparation Example 3. The electrochromic device developed a black color and showed a transmission of 18%. Upon quenching, the electrochromic device showed a transmission of 74%.

1-6. Electrochromic Device (3) Comprising Acetamide-LiTFSI Eutectic Mixture as Gel Polymer Electrolyte Example 1-4 was repeated to provide an electrochromic device including a eutectic mixture-containing gel polymer electrolyte, except that the electrochromic device obtained from Preparation Example 2 was used instead of the electrochromic device obtained from Preparation Example 1. The electrochromic device developed a dark blue color and showed a transmission of 17%. Upon quenching, the electrochromic device showed a transmission of 55%.

1-7. Electrochromic Device (4) Comprising Acetamide-LiTFSI Eutectic Mixture as Gel Polymer Electrolyte The eutectic mixture of acetamide with LiTFSI obtained from Example 1-1, TAEI (tris[2-(acryloxy)ethyl]isocyanurate) as crosslinking agent, MPEGM (methoxy poly(ethylene)glycol)methacrylate) as monomer and Irgacure-184 (available from Ciba-Geigy Corp.) as UV polymerization initiator were mixed in a weight ratio of 50:0.5:50:10 to provide an electrolyte precursor and the resultant electrolyte precursor was injected into the electrochromic device obtained from Preparation Example 1 through an inlet for electrolyte. Then, the inlet was sealed with a UV sealant and polymerization was carried out by UV irradiation for 30 minutes to form a gel polymer electrolyte. The electrochromic device using such transparent gel polymer electrolyte developed a dark blue color and showed a transmission of 30%. Upon quenching, the electrochromic device showed a transmission of 81%.

1-8. Electrochromic Device (5) Comprising Acetamide-LiTFSI Eutectic Mixture as Gel Polymer Electrolyte Example 1-7 was repeated to provide an electrochromic device including a eutectic mixture-containing gel polymer electrolyte, except that the electrochromic device obtained from Preparation Example 3 was used instead of the electrochromic device obtained from Preparation Example 1. The electrochromic device developed a black color and showed a transmission of 19%. Upon quenching, the electrochromic device showed a transmission of 75%.

Example 2

Example 1-1 was repeated to provide 9.6 g of the eutectic mixture of urea with LiTFSI, except that 3.6 g of purified urea was used instead of 5 g of purified acetamide and the starting materials were stirred gradually at 70° C. under nitrogen atmosphere for 12 hours. Additionally, electrochromic devices were provided by using the urea-LiTFSI eutectic mixture in the same manner as Examples 1-2 to 1-8.

Example 3

Example 1-1 was repeated to provide 7 g of the eutectic mixture of methylurea with LiTFSI (lithium trifluoromethanesulfonamide), except that 3.1 g of methylurea and 4 g of LiTFSI were used instead of 5 g of purified acetamide and 6 g of LiTFSI, and the starting materials were stirred gradually at 30° C. under nitrogen atmosphere for 12 hours. Additionally, electrochromic devices were provided by using the methylurea-LiTFSI eutectic mixture in the same manner as Examples 1-2 to 1-8.

Example 4

4-1. Preparation of Caprolactam-LiTFSI Eutectic Mixture 5.9 g of purified caprolactam and 5 g of LiTFSI were introduced into a round-bottom flask and stirred gradually at 40° C. under nitrogen atmosphere for 5 minutes and then at room temperature for 4 hours to provide 10.5 g of the eutectic mixture of caprolactam with LiTFSI.

4-2. Electrochromic Device Comprising Caprolactam-LiTFSI Eutectic Mixture as Liquid Electrolyte Example 1-2 was repeated to provide an electrochromic device, except that the caprolactam-LiTFSI eutectic mixture obtained from Example 4-1 was used instead of the acetamide-LiTFSI eutectic mixture obtained from Example 1-1. The electrochromic device developed a blue color and showed a transmission of 31%. Upon quenching, the electrochromic device showed a transmission of 77%.

4-3. Electrochromic Device Comprising Caprolactam-LiTFSI Eutectic Mixture as Gel Polymer Electrolyte Example 1-3 was repeated to provide an electrochromic device, except that the caprolactam-LiTFSI eutectic mixture obtained from Example 4-1 was used instead of the acetamide-LiTFSI eutectic mixture obtained from Example 1-1. The electrochromic device developed a black color and showed a transmission of 18%. Upon quenching, the electrochromic device showed a transmission of 73%.

4-4. Electrochromic Device Comprising Caprolactam-LiTFSI Eutectic Mixture as Gel Polymer Electrolyte Example 1-4 was repeated to provide an electrochromic device, except that the caprolactam-LiTFSI eutectic mixture obtained from Example 4-1 was used instead of the acetamide-LiTFSI eutectic mixture obtained from Example 1-1. The electrochromic device developed a blue color and showed a transmission of 32%. Upon quenching, the electrochromic device showed a transmission of 79%.

Example 5

Example 1-1 was repeated to provide 10.7 g of the eutectic mixture of valerlactam with LiTFSI (lithium trifluoromethanesulfonamide), except that 5.7 g of valerlactam and 5 g of LiTFSI were used instead of 5 g of purified acetamide and 6 g of LiTFSI, and the starting materials were stirred gradually at 30° C. under nitrogen atmosphere for 10 minutes and then at room temperature for 10 hours. Additionally, electrochromic devices were provided by using the valerlactam-LiTFSI eutectic mixture in the same manner as Examples 1-2 to 1-8.

Example 6

Example 1-1 was repeated to provide 8.7 g of the eutectic mixture of trifluoroacetamide with LiTFSI, except that 4.7 g of purified trifluoroacetamide and 4 g of LiTFSI were used instead of 5 g of purified acetamide and 6 g of LiTFSI, and the starting materials were stirred at 40° C. for 5 minutes and then at room temperature for 3 hours. Additionally, electrochromic devices were provided by using the trifluoroacetamide-LiTFSI eutectic mixture in the same manner as Examples 1-2 to 1-8.

Example 7

Example 1-1 was repeated to provide 7 g of the eutectic mixture of methylurea with $LiClO_4$ (lithium perchlorate), except that 3.1 g of purified methylurea and 4 g of $LiClO_4$ were used instead of 5 g of purified acetamide and 6 g of LiTFSI, and the starting materials were stirred gradually at 50° C. under nitrogen atmosphere for 4 hours and then cooled to room temperature. Additionally, electrochromic devices were provided by using the methylurea-$LiClO_4$ eutectic mixture in the same manner as Examples 1-2 to 1-8.

Example 8

Example 1-1 was repeated to provide 11 g of the eutectic mixture of acetamide with $LiSO_2CF_3$ (lithium triflate), except that 5.7 g of purified acetamide and 5 g of $LiSO_2CF_3$ were used instead of 5 g of purified acetamide and 6 g of LiTFSI, and the starting materials were stirred gradually at 30° C. under nitrogen atmosphere for 10 hours. Additionally, electrochromic devices were provided by using the acetamide-$LiSO_2CF_3$ eutectic mixture in the same manner as Examples 1-2 to 1-8.

Example 9

Example 1-1 was repeated to provide 12 g of the eutectic mixture of methylurea with $LiSO_2CF_3$ (lithium triflate), except that 7.1 g of purified methylurea and 5 g of $LiSO_2CF_3$ were used instead of 5 g of purified acetamide and 6 g of LiTFSI, and the starting materials were stirred gradually at 50° C. under nitrogen atmosphere for 4 hours and then cooled to room temperature. Additionally, electrochromic devices were provided by using the methylurea-$LiSO_2CF_3$ eutectic mixture in the same manner as Examples 1-2 to 1-8.

Example 10

Example 1-1 was repeated to provide 12 g of the eutectic mixture of methylcarbamate with LiTFSI, except that 7.6 g of purified methylcarbamate and 10 g of LiTFSI were used instead of 5 g of purified acetamide and 6 g of LiTFSI, and the starting materials were stirred gradually at room temperature under nitrogen atmosphere for 3 hours. Additionally, electrochromic devices were provided by using the methylcarbamate-LiTFSI eutectic mixture in the same manner as Examples 1-2 to 1-8.

Example 11

Example 1-1 was repeated to provide 17 g of the eutectic mixture of N-benzylforamide with LiTFSI, except that 14.1 g of purified N-benzylforamide and 10 g of LiTFSI were used instead of 5 g of purified acetamide and 6 g of LiTFSI, and the starting materials were stirred gradually at 40° C. under nitrogen atmosphere for 10 minutes and then at room temperature for 3 hours. Additionally, electrochromic devices were provided by using the benzylforamide-LiTFSI eutectic mixture in the same manner as Examples 1-2 to 1-8.

Example 12

Example 1-1 was repeated to provide 22 g of the eutectic mixture of methylcarbamate with LiSCN, except that 17.1 g of purified methylcarbamate and 5 g of LiSCN were used instead of 5 g of purified acetamide and 6 g of LiTFSI, and the starting materials were stirred gradually at 50° C. under nitrogen atmosphere for 4 hours and then cooled to room temperature. Additionally, electrochromic devices were provided by using the methylcarbamate-LiSCN eutectic mixture in the same manner as Examples 1-2 to 1-8.

COMPARATIVE EXAMPLES 1-3

Comparative Example 1

Electrochromic Device Comprising Liquid Electrolyte

An electrochromic device was manufactured in the same manner as described in Example 1-2, except that GBL (γ-butyrolactone) containing 1M LiClO$_4$ was used as liquid electrolyte. The electrochromic device developed a dark blue color and showed a transmission of 34%. Upon quenching, the electrochromic device was transparent and showed a transmission of 76%. However, because the electrochromic device used an organic solvent as electrolyte, it caused a problem related with evaporation and exhaustion of electrolyte. Additionally, there was still a possibility for side reactions resulting in decomposition of organic substances when the electrochromic device was subjected to repeated developing/quenching cycles for a long time.

Comparative Example 2

Electrochromic Device Comprising Liquid Electrolyte

An electrochromic device was manufactured in the same manner as described in Example 1-2, except that propylene carbonate (PC) was used as liquid electrolyte instead of GBL (γ-butyrolactone) containing 1M LiClO$_4$. The electrochromic device developed a dark blue color and showed a transmission of 32%. Upon quenching, the electrochromic device was transparent and showed a transmission of 74%. However, because the electrochromic device used an organic solvent as electrolyte, it caused a problem related with evaporation and exhaustion of the electrolyte. Additionally, there was still a possibility for side reactions resulting in decomposition of organic substances when the electrochromic device was subjected to repeated developing/quenching cycles for a long time

Comparative Example 3

Electrochromic Device Comprising Ionic Liquid Electrolyte

Figure 5:
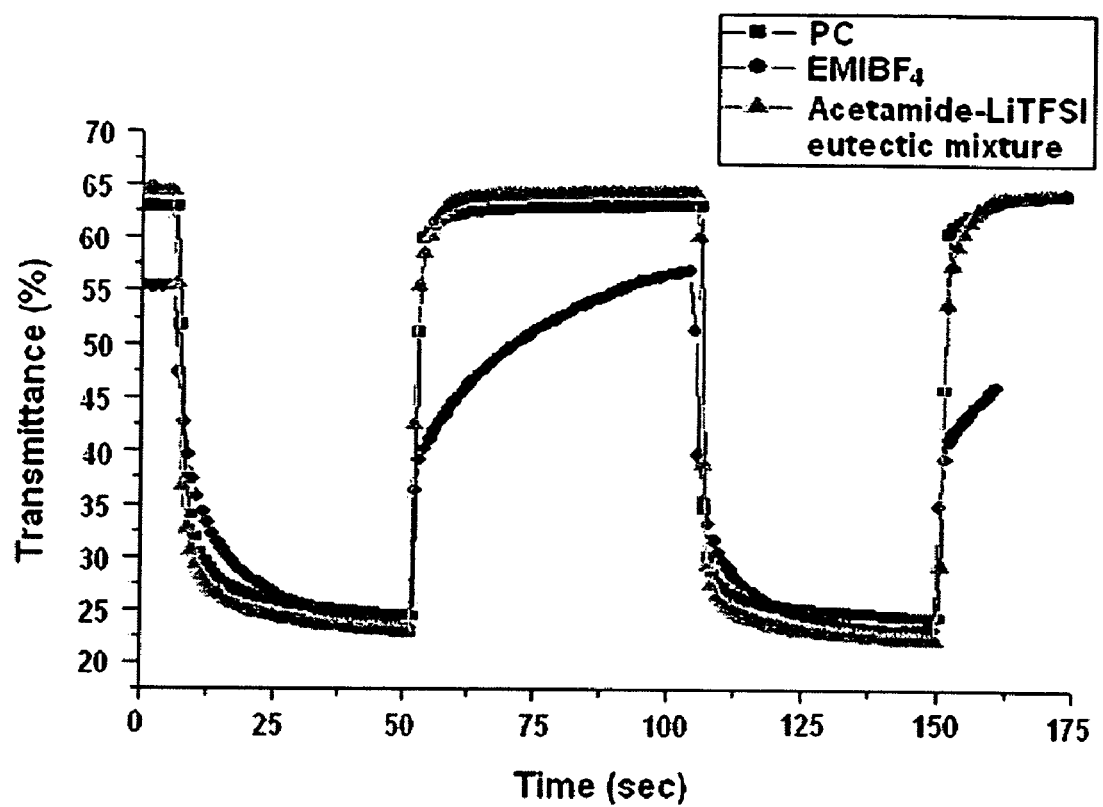
FIG. 5 is a graph showing variations in transmittance with time for electrochemical devices, each using the electrolyte comprising acetamide-LiTFSI (Lithium Trifluoromethane sulfonimide) eutectic mixture (molar ratio 4:1) according to Example 1, propylene carbonate (PC) according to Comparative Example 2, and ionic liquid ([EMIM][BF₄]) according to Comparative Example 3.

An electrochromic device was manufactured in the same manner as described in Example 1-2, except that ionic liquid of [EMIM] [BF$_4$] (1-ethyl-3-methylimidazolium tetrafluoroborate) was used as the liquid electrolyte. The electrochromic device developed a dark blue color and showed a transmission of 41%. Upon quenching, the electrochromic device was transparent and showed a transmission of 67% (see, FIG. 5). Through the use of ionic liquid, problems related with a residual image upon quenching and decomposition of the electrolyte could be solved. However, there were still problems of electrolyte leakage and non-applicability to formation into thin films and film-shaped products.

Experimental Example 1

Evaluation for Physical Properties of Eutectic Mixtures

The following test was performed to evaluate physical properties of eutectic mixtures according to the present invention.

Each of the eutectic mixtures according to Examples 1-12 was used as sample, and each of acetamide and LiTFSI was used as control. Melting point of each compound was measured by using DSC (differential scanning calorimeter). The results are shown in the following Table 1.

After the experiment, acetamide and LiTFSI have a melting point of 81.2° C. and 234° C., respectively. On the contrary, the eutectic mixture obtained from acetamide and LiTFSI according to Example 1 showed a melting point of −67° C. This indicates that the amide compound forms a eutectic mixture together with the lithium salt. Similarly, each of the eutectic mixtures according to Examples 2 to 12 showed a low melting point. Therefore, the eutectic mixture according to the present invention is present in a liquid phase at room temperature (see, Table 1)

TABLE 1

| Example | Compound having acidic functional group and basic functional group | Lithium salt | m.p. (° C.) | Ratio (Compound having acidic functional group and basic functional group: Lithium salt) | Conductivity (mS/cm) | Electro-chemical window (vs Li/Li$^+$) | Viscosity (cP) |
|---|---|---|---|---|---|---|---|
| 1 | Acetamide | LiTFSI | −67 | 4:1 | 1.07 | 0.7~4.4 | 100 |
| 2 | Urea | LiTFSI | −37.7 | 3:1 | 0.23 | 0.8~3.8 | 1190 |
| 3 | Methylurea | LiTFSI | −8.2 | 3:1 | 0.12 | 0.5~5.3 | 677 |
| 4 | Caprolactam | LiTFSI | −38.5 | 3:1 | 0.03 | 0~5.5 | 3100 |
| 5 | Valerlactam | LiTFSI | −44.8 | 3:1 | 0.17 | 0.5~5.5 | 910 |
| 6 | Trifluoro-acetamide | LiTFSI | −10.7 | 3:1 | 0.83 | 0.9~6.7 | 89 |

TABLE 1-continued

| Example | Compound having acidic functional group and basic functional group | Lithium salt | m.p. (° C.) | Ratio (Compound having acidic functional group and basic functional group: Lithium salt) | Conductivity (mS/cm) | Electrochemical window (vs Li/Li$^+$) | Viscosity (cP) |
|---|---|---|---|---|---|---|---|
| 7 | Methylurea | LiClO$_4$ | −9.2 | 3:1 | 0.22 | 1.3~5.3 | 990 |
| 8 | Acetamide | LiSO$_2$CF$_3$ | −50.3 | 3:1 | 3.47 | 0.8~5.5 | 30 |
| 9 | Methylurea | LiSO$_2$CF$_3$ | −34.4 | 3:1 | 2.50 | 0.7~5.7 | 85 |
| 10 | Methylcarbamate | LiTFSI | −65 | 3:1 | 1.43 | 1.3~6.4 | 23 |
| 11 | N-benzyl foramide | LiTFSI | −51.7 | 3:1 | 0.3 | 1.2~5.3 | 79 |
| 12 | Methylcarbamate | LiSCN | 10 | 3:1 | 1.7 | 1.4~4.6 | 22 |
| Control | Acetamide | | 81.2 | | | | |
| Control | | LiTFSI | 234 | | | | |

Experimental Example 2

Evaluation for Quality of Electrochromic Device (1)

Reflectance of each electrochromic device comprising a eutectic mixture according to the present invention as electrolyte was measured as follows.

Figure 4:
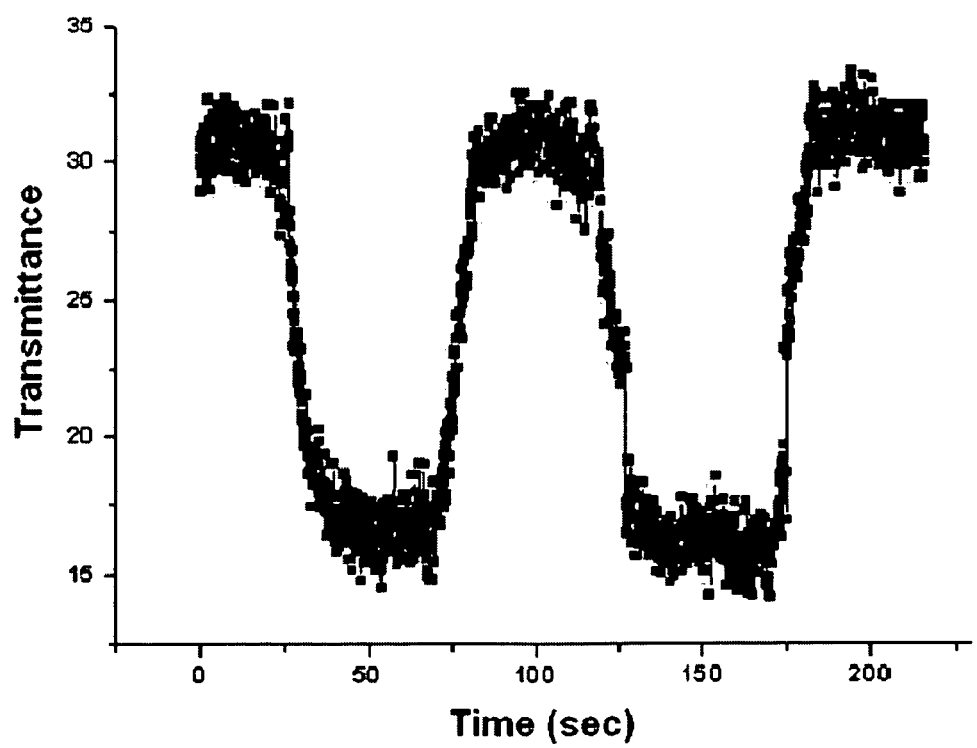
FIG. 4 is a graph showing variations in transmittance with time for an electrochemical device using the electrolyte comprising caprolactam-LiTFSI (Lithium Trifluoromethane sulfonimide) eutectic mixture (molar ratio 3:1) according to Example 4.

The electrochromic device comprising the caprolactam-LiTFSI eutectic mixture-containing electrolyte according to Example 4 was used for measurement of reflectance. The electrochromic device showed a transmittance of about 30%, upon color quenching (see, FIG. 4). Additionally, a response rate of several seconds is needed for color developing and quenching. This indicates that the electrochromic device realizes color developing and quenching as electrochromic device.

Experimental Example 3

Evaluation for Quality of Electrochromic Device Depending on the Kind of Electrolyte (2)

Each electrochromic device using the eutectic mixture according to the present invention, a conventional organic solvent or an ionic liquid as electrolyte was evaluated for quality as follows.

The electrochromic device using the eutectic mixture (AAL) obtained from Example 1 as electrolyte was used. The electrochromic device using propylene carbonate (PC), a conventional organic solvent, as liquid electrolyte according to Comparative Example 2 and the electrochromic device using an ionic liquid electrolyte ([EMIM][BF$_4$]) according to Comparative Example 3 were used as controls.

After measuring color developing/quenching rate of each electrochromic device, the electrochromic device using an ionic liquid electrolyte ([EMIM][BF$_4$]) according to Comparative Example 3 showed a significantly low color developing/quenching rate. On the contrary, the electrochromic device using the eutectic mixture (AAL, 99.6 cp) obtained from Example 1 as electrolyte showed a color developing/quenching rate comparable to that of the electrochromic device using the organic solvent (PC, 0.6 cp) as electrolyte according to Comparative Example 2, even though the eutectic mixture has a significantly higher viscosity compared to the organic solvent (see, FIG. 5).

INDUSTRIAL APPLICABILITY

As can be seen from the foregoing, the electrochromic device according to the present invention uses an electrolyte comprising a eutectic mixture, which is cost-efficient and has excellent thermal and chemical stability. Therefore, there are no problems related with evaporation and exhaustion as well as flammability of electrolyte. Additionally, it is possible to minimize side reactions between constitutional elements of an electrochromic device and electrolyte, thereby improving the safety. Further, it is also possible to improve the quality of an electrochromic device by virtue of a broad electrochemical window and high electroconductivity of the eutectic mixture.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An electrolyte for electrochromic devices, which includes a eutectic mixture comprising:
   (a) a compound having an amide group; and
   (b) an ionizable lithium salt,
   wherein a molar ratio (%) of the compound having an amide group to the ionizable lithium salt ranges from 2:1 to 6:1 and the eutectic mixture is represented by the following Formula 1:

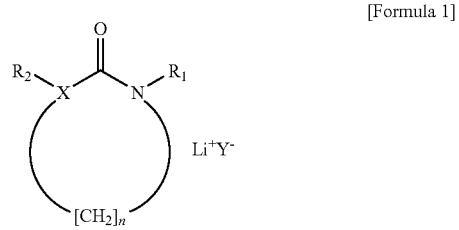

[Formula 1]

wherein R$_1$ is a hydrogen atom, C1~C20 alkyl group, C1~C20 alkylamine group, alkenyl group, aryl group or allyl group;

R$_2$ can be a hydrogen atom, C1~C20 alkyl group, alkenyl group, aryl group or allyl group;

X is a oxygen, carbon or nitrogen atom, with the proviso that where X is oxygen, R$_2$ is null;

Y is at least one anion selected from the group consisting of F$^-$, Cl$^-$, Br$^-$, I$^-$, NO$_3{}^-$, N(CN)$_2{}^-$, BF$_4{}^-$, ClO$_4{}^-$, RCOO$^-$;

$PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3CF_2(CF_3)_2CO^-$, $(SF_5)_3C^-$, $CF_3CO_2^-$, $CH_3CO_2^-$, and SCN; and n is an integer of between 1 and 10.

2. The electrolyte according to claim 1, which is a liquid electrolyte comprising the eutectic mixture alone.

3. The electrolyte according to claim 1, which is a gel polymer electrolyte formed by polymerization of an electrolyte precursor solution comprising: (i) the eutectic mixture; and (ii) a monomer capable of forming a gel polymer by polymerization.

4. The electrolyte according to claim 3, wherein the monomer is a vinyl monomer.

5. The electrolyte according to claim 4, wherein the vinyl monomer is at least one selected from the group consisting of acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxystyrene and para-cyanostyrene.

6. The electrolyte according to claim 3, wherein the electrolyte precursor solution further comprises a polymerization initiator or photoinitiator.

7. The electrolyte according to claim 6, wherein the electrolyte precursor solution has a mixing ratio, on the weight basis, expressed as x+y+z=1, wherein the terms x=weight ratio of a eutectic mixture compared to the total weight of the electrolyte precursor and falls within the range of 0.5-0.95; wherein y=weight ratio of the monomer capable of forming a gel polymer by polymerization compared to the total weight of the electrolyte precursor and falls within the range of 0.05-0.5; and wherein z=weight ratio of the polymerization initiator compared to the total weight of the electrolyte precursor and falls within the range of 0.00-0.05.

8. The electrolyte according to claim 3, which is prepared by in-situ polymerization of the electrolyte precursor solution inside an electrochromic device.

9. The electrolyte according to claim 1, which comprises a polymer or gel polymer impregnated with the eutectic mixture.

10. The electrolyte according to claim 9, wherein the polymer is selected from the group consisting of polymethyl methacrylate, polyvinylidene difluoride, polyvinyl chloride, polyethylene oxide and polyhydroxyethyl methacrylate.

11. An electrochromic device comprising:
(a) a first electrode;
(b) a second electrode;
(c) an electrochromic material; and
(d) an electrolyte as defined in claim 1.

12. The electrochromic device according to claim 11, which comprises the electrochromic material in at least one of the first electrode, second electrode and the electrolyte.

13. The electrochromic device according to claim 11, wherein the electrochromic material comprises: (a) an inorganic metal oxide selected from the group consisting of $WO_3$, $Ir(OH)_x$, $MoO_3$, $V_2O_5$, $TiO_2$, $NiO_x$, $LiNiO_x$ and $Li_2NiO_x$; (b) a conductive polymer selected from the group consisting of polypyrrole, polyaniline, polyazulene, polypyridine, polyindole, polycarbazole, polyazine and polythiophene; or (c) an organic electrochromic material selected from the group consisting of viologen, anthraquinone and phenocyazine.

14. The electrochromic device according to claim 11, wherein either or both of the first electrode and second electrode comprise a transparent conductive film.

15. The electrochromic device according to claim 14, wherein the transparent conductive film is formed of at least one material selected from the group consisting of ITO (indium tin oxide), FTO (fluorine doped tin oxide) and IZO (indium zinc oxide).

* * * * *